US008983294B2

(12) United States Patent
Pfau et al.

(10) Patent No.: US 8,983,294 B2
(45) Date of Patent: Mar. 17, 2015

(54) FORWARD ERROR CORRECTION FOR AN OPTICAL TRANSPORT SYSTEM

(75) Inventors: Timo J. Pfau, Westfield, NJ (US);
Noriaki Kaneda, Westfield, NJ (US);
Brian S. Krongold, Brunswick West (AU)

(73) Assignee: Alcatel Lucent, Boulogne-Billancourt (FR)

( * ) Notice: Subject to any disclaimer, the term of this patent is extended or adjusted under 35 U.S.C. 154(b) by 219 days.

(21) Appl. No.: 13/537,131

(22) Filed: Jun. 29, 2012

(65) Prior Publication Data

US 2014/0003813 A1  Jan. 2, 2014

(51) Int. Cl.
*H04J 14/06* (2006.01)
*H04B 10/61* (2013.01)
*H04B 10/079* (2013.01)
(Continued)

(52) U.S. Cl.
CPC ............ *H04J 14/06* (2013.01); *H04B 10/0799* (2013.01); *H04B 10/611* (2013.01); *H04B 10/613* (2013.01); *H04B 10/614* (2013.01); *H04B 10/616* (2013.01); *H04L 1/0041* (2013.01); *H04L 1/0054* (2013.01); *H04L 1/0057* (2013.01); *H04L 27/2096* (2013.01)
USPC ............................................ 398/65; 398/203

(58) Field of Classification Search
CPC ............ H04B 10/616; H04L 25/03178; H04L 1/0054
USPC .................................................. 398/65, 203
See application file for complete search history.

(56) References Cited

U.S. PATENT DOCUMENTS

| 7,046,935 | B1 | 5/2006 | Fang et al. |
| 7,145,968 | B2 | 12/2006 | Kuo et al. |
| 7,286,762 | B2 | 10/2007 | Elahmadi et al. |

(Continued)

FOREIGN PATENT DOCUMENTS

WO  2010107439 A1  9/2010

OTHER PUBLICATIONS

"Next-Generation Optical Communication Systems," 2011, www.stratresearch.se [retrieved on Apr. 17, 2012]. Retrieved from the Internet: <URL: http://www.stratresearch.se/PageFiles/2441/6f%20Peter%20Andrekson%20Chalmers.pdf> (24 pages).

(Continued)

*Primary Examiner* — Nathan Curs
(74) *Attorney, Agent, or Firm* — Mendelsohn, Drucker & Dunleavy, P.C.; Yuri Gruzdkov

(57) ABSTRACT

An optical transport system that transmits data using relatively short FEC-encoded data frames. The corresponding modulated optical signals are decoded at an optical receiver using frame-based maximum likelihood sequence estimation that relies on data redundancy present in each FEC-encoded data frame for the determination of its source bits. In some embodiments, the modulated optical signals carrying the FEC-encoded data frames are generated using a polarization-division-multiplexed constellation. The FEC-coding rate and frame length can be adjusted without changing the constellation, which advantageously enables the optical transport system to dynamically adapt its transmission format to the changing link conditions in a manner that results in better overall receiver sensitivity than that achieved with comparable bit-rate-adaptation methods that rely on a constellation change rather than on a change of the FEC-coding rate.

17 Claims, 4 Drawing Sheets

(51) Int. Cl.
*H04L 1/00* (2006.01)
*H04L 27/20* (2006.01)

(56) References Cited

U.S. PATENT DOCUMENTS

| | | | |
|---|---|---|---|
| 7,474,860 | B2 | 1/2009 | Essiambre et al. |
| 7,974,357 | B2 | 7/2011 | Maret et al. |
| 2002/0063934 | A1* | 5/2002 | Sakauchi ............... 359/173 |
| 2003/0063353 | A1* | 4/2003 | Hamoir ................. 359/181 |
| 2005/0226638 | A1* | 10/2005 | Nesset et al. ............ 398/188 |
| 2008/0199191 | A1 | 8/2008 | Essiambre et al. |
| 2009/0147648 | A1 | 6/2009 | Vlutters |
| 2010/0061737 | A1 | 3/2010 | Kato |
| 2010/0158521 | A1 | 6/2010 | Doerr et al. |
| 2010/0247107 | A1 | 9/2010 | Sadot et al. |
| 2011/0038631 | A1 | 2/2011 | Doerr |
| 2011/0150147 | A1* | 6/2011 | Yang et al. ............. 375/341 |
| 2012/0033682 | A1* | 2/2012 | Corral ................... 370/476 |
| 2012/0148255 | A1 | 6/2012 | Liu et al. |
| 2012/0148264 | A1 | 6/2012 | Liu et al. |
| 2013/0209089 | A1* | 8/2013 | Harley et al. ............ 398/25 |
| 2013/0343750 | A1* | 12/2013 | Lanzone et al. ......... 398/34 |

OTHER PUBLICATIONS

Karlsson, Magnus, et al., "Which is the Most Power-Efficient Modulation Format in Optical Links?" Optics Express, 2009, vol. 17, No. 13, pp. 10814-10819.

Johannisson, Pontus, et al., "A Modified Constant Modulus Algorithm for Polarization-Switched QPSK," Optics Express, vol. 19, No. 8, 2011, pp. 7734-7741.

Liu, Xiang, et al., "Demonstration of 2.7-PPB Receiver Sensitivity Using PDM-QPSK with 4-PPM and Unrepeatered Transmission over a Single 370-km Unamplified Ultra-Large-Area Fiber Span," European Conference and Exposition on Optical Communications (ECOC) Geneva, Switzerland, Sep. 18, 2011 (6 pages).

Serena, P., et al., "The Performance of Polarization Switched-QPSK (PS-QPSK) in Dispersion Managed WDM Transmissions," 36th European Conference and Exhibition on Optical Communication (ECOC), 2010, Torino Italy, pp. 1-3.

Chatzidiamantis, Nestor D., et al., "EM-Based Maximum-Likelihood Sequence Detection for MIMO Optical Wireless Systems," ICC'09 Proceedings of the 2009 IEEE International Conference on Communications, pp. 2583-2587.

Alfiad, Mohammad S., et al., "Maximum-Likelihood Sequence Estimation for Optical Phase-Shift Keyed Modulation Formats," Journal of Lightwave Technology, 2009, vol. 27, No. 20, pp. 4583-4594.

Millar, David S., et al., "Blind Adaptive Equalization of Polarization-Switched QPSK Modulation," Optics Express, 2011, vol. 19, No. 9, pp. 8533-8538.

Poggiolini, P., et al., "Performance Evaluation of Coherent WDM PS-QPSK (HEXA) Accounting for Non-Linear Fiber Propagation Effects," Optics Express, 2010, vol. 18, No. 11, pp. 11360-11371.

Su, Karen, "Efficient Maximum Likelihood Detection for Communication over Multiple Input Multiple Output Channels," Technical Report, University of Cambridge, Cambridge, UK, Feb. 2005, <http://www.cl.cam.ac.uk/research/dtg/publications/public/ks349/Su05B.pdf> (44 pages).

Krongold, Brian S., et al., "Blind Equalization for Polarization-Switched QPSK Optical Communications," U.S. Appl. No. 13/335,326, filed Dec. 22, 2011.

* cited by examiner

100

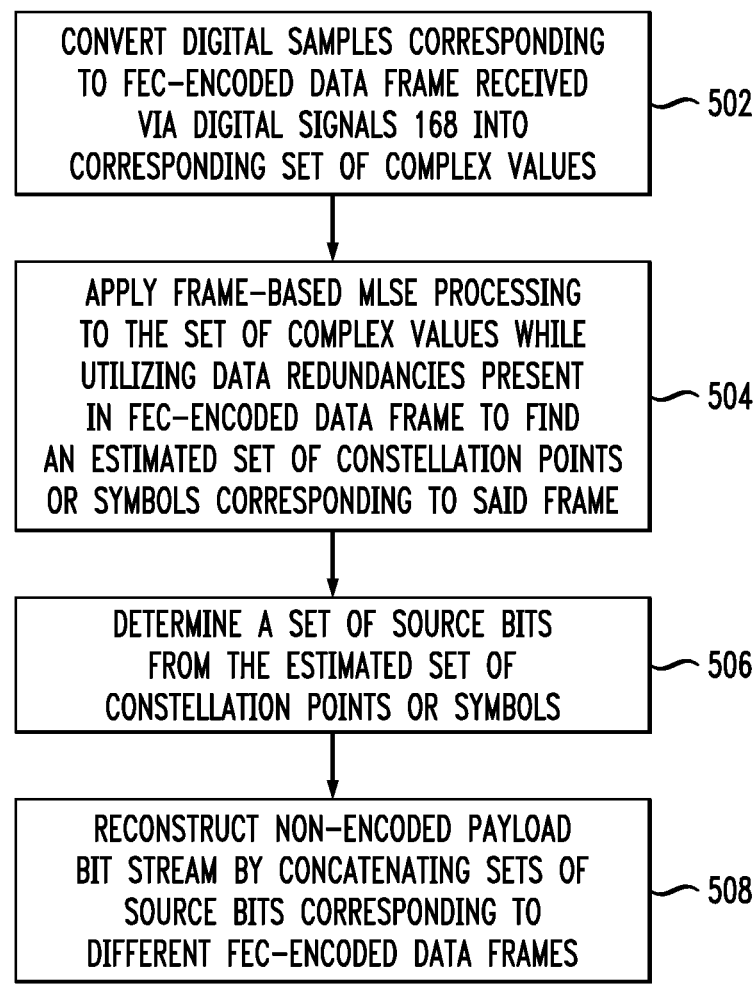

FORWARD ERROR CORRECTION FOR AN OPTICAL TRANSPORT SYSTEM

BACKGROUND

1. Field

The present invention relates to optical communication equipment and, more specifically but not exclusively, to efficient use of forward-error-correction (FEC) techniques in optical transport systems, such as those having a polarization-division-multiplexing capability.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Receiver sensitivity is an important performance metric of an optical transport system. Higher receiver sensitivity is beneficial, for example, because it enables transmission over relatively long fiber-optic transmission links without signal regeneration. Development of signal-processing methods that can increase receiver sensitivity is therefore desirable.

SUMMARY

Disclosed herein are various embodiments of an optical transport system that transmits data using relatively short FEC-encoded data frames. The corresponding modulated optical signals are decoded at an optical receiver using frame-based maximum likelihood sequence estimation (MLSE) that relies on data redundancy present in each FEC-encoded data frame for the determination of its source bits. Due to the relatively short lengths of the FEC-encoded data frames, the frame-based MLSE processing can advantageously be implemented at the optical receiver without imposing a heavy computational burden on its digital processor.

In some embodiments, the modulated optical signals carrying the FEC-encoded data frames are generated using a polarization-division-multiplexed constellation, with the two polarizations of the corresponding modulated optical signal being used to carry different respective sets of bits of the FEC-encoded data frame. The FEC-coding rate and frame length can be adjusted without changing the constellation, which advantageously enables the optical transport system to dynamically adapt its transmission format to the changing link conditions in a manner that results in better overall receiver sensitivity than that achieved with comparable bit-rate-adaptation methods that rely on a constellation change rather than on a change of the FEC-coding rate.

According to one embodiment, provided is an apparatus comprising an optical receiver configured to: convert a modulated optical signal corresponding to a first FEC-encoded data frame into a first set of digital values; and apply MLSE processing to the first set of digital values to determine a set of source bits corresponding to the first FEC-encoded data frame.

In some embodiments of the above apparatus, the optical receiver is configured to convert the modulated optical signal corresponding to the first FEC-encoded data frame into (i) a first subset of digital values corresponding to a first polarization of light and (ii) a second subset of digital values corresponding to a second polarization of light, wherein: the first polarization is orthogonal to the second polarization; and the first set of digital values includes said first subset of digital values and said second subset of digital values.

In some embodiments of any of the above apparatus, the optical receiver is further configured to determine the set of source bits based on (i) a polarization-division-multiplexed (PDM) constellation corresponding to the modulated optical signal and (ii) data redundancy of the first FEC-encoded data frame.

In some embodiments of any of the above apparatus, the PDM constellation is a PDM-QPSK constellation having four constellation points corresponding to a first polarization of light and another four constellation points corresponding to a second polarization of light orthogonal to the first polarization.

In some embodiments of any of the above apparatus, the optical receiver is further configured to: apply said MLSE processing to the first set of digital values to find an estimated set of constellation points or symbols of the PDM constellation corresponding to the first FEC-encoded data frame; and determine the set of source bits based on said estimated set of constellation points or symbols of the PDM constellation.

In some embodiments of any of the above apparatus, the optical receiver is further configured to concatenate two or more sets of source bits corresponding to two or more different FEC-encoded data frames to generate an output data stream corresponding to the modulated optical signal.

In some embodiments of any of the above apparatus, the optical receiver is further configured to: convert a modulated optical signal corresponding to a second FEC-encoded data frame into a second set of digital values; and apply MLSE processing to said second set of digital values to determine a set of source bits corresponding to the second FEC-encoded data frame, wherein: the first FEC-encoded data frame has a first FEC-coding rate; the second FEC-encoded data frame has a second FEC-coding rate; and the second FEC-coding rate is different from the first FEC-coding rate.

In some embodiments of any of the above apparatus, the first set of source bits consists of a first number of bits; the second set of source bits consists of a second number of bits; and the first number is different from the second number.

In some embodiments of any of the above apparatus, the optical receiver is configured to determine source bits from an FEC-encoded data frame whose FEC-coding rate belongs to a set of FEC-coding rates comprising at least one of the values of $3/4$, $1/2$, and $2/5$.

In some embodiments of any of the above apparatus, the optical receiver comprises: a front-end circuit configured to: mix the modulated optical signal with an optical reference signal to generate a plurality of mixed optical signals; and convert the plurality of mixed optical signals into a corresponding plurality of digital electrical signals, wherein the plurality of digital electrical signals comprises (i) a first in-phase signal and a first quadrature signal that have digital signal samples corresponding to a first polarization of light and (ii) a second in-phase signal and a second quadrature signal that have digital signal samples corresponding to a second polarization of light; and a digital signal processor configured to convert the digital signal samples corresponding to the first and second polarizations into the first set of digital values.

In some embodiments of any of the above apparatus, the digital signal processor is further configured to apply said MLSE processing to the first set of digital values to determine the set of source bits.

In some embodiments of any of the above apparatus, to convert the digital signal samples into the first set of digital values, the digital signal processor is configured to perform one or more of the following: timing recovery for the first FEC-encoded data frame; frame synchronization for the first FEC-encoded data frame; electronic polarization rotation applied to the digital signal samples; electronic frequency estimation of a carrier frequency of the modulated optical signal; electronic compensation of a frequency offset between a carrier frequency of the optical reference signal and the carrier frequency of the modulated optical signal; electronic compensation of effects of polarization-mode dispersion in the modulated optical signal; electronic compensation of effects of chromatic dispersion in the modulated optical signal; and electronic channel equalization applied to the digital signal samples.

In some embodiments of any of the above apparatus, the optical receiver is further configured to: determine a bit-error rate (BER) corresponding to the modulated optical signal; generate a control signal based on the determined BER; and send the control signal to an optical transmitter that caused the optical receiver to receive the modulated optical signal.

In some embodiments of any of the above apparatus, the apparatus further comprises the optical transmitter, wherein the optical transmitter is configured to change an FEC-coding rate from a value used for the first FEC-encoded data frame to a different value based on the control signal.

In some embodiments of any of the above apparatus, the apparatus further comprises the optical transmitter, wherein the optical transmitter is configured to generate one or more parity bits for the first FEC-encoded data frame by applying an XOR operation to two or more source bits.

In some embodiments of any of the above apparatus, the apparatus further comprises the optical transmitter, wherein the optical transmitter comprises: a digital signal processor configured to convert an input data stream into a sequence of FEC-encoded data frames and further convert each FEC-encoded data frame into a respective set of constellation symbols of a PDM constellation; and an optical modulator configured to modulate an optical carrier using said sets of constellation symbols to generate a modulated optical signal for transmission of said FEC-encoded data frames to the optical receiver.

In some embodiments of any of the above apparatus, the PDM constellation is a PDM-QPSK constellation having four constellation points corresponding to a first polarization of light and another four constellation points corresponding to a second polarization of light orthogonal to the first polarization.

In some embodiments of any of the above apparatus, the optical receiver is further configured to: apply maximum likelihood sequence estimation (MLSE) processing to the first set of digital values to determine a set of log-likelihood ratios corresponding to the first FEC-encoded data frame; and determine the set of source bits corresponding to the first FEC-encoded data frame based on said set of log-likelihood ratios.

According to another embodiment, provided is an apparatus comprising an optical transmitter configured to: generate a first modulated optical signal corresponding to a first FEC-encoded data frame, said first modulated optical signal having a first polarization; generate a second modulated optical signal corresponding to the first FEC-encoded data frame, said second modulated optical signal having a second polarization; and multiplex the first and second modulated optical signals for transmission, wherein: the first modulated optical signal carries a first set of bits of the first FEC-encoded data frame; and the second modulated optical signal carries a second set of bits of the first FEC-encoded data frame different from the first set.

According to yet another embodiment, provided is an apparatus comprising an optical receiver configured to: receive a polarization-division-multiplexed (PDM) optical signal corresponding to a first FEC-encoded data frame; and process the PDM optical signal to determine bits of the first FEC-encoded data frame, wherein: a first set of the bits of the first FEC-encoded data frame is determined based on a first polarization of the PDM optical signal; and a second set of the bits of the first FEC-encoded data frame different from the first set is determined based on a second polarization of the PDM optical signal.

BRIEF DESCRIPTION OF THE DRAWINGS

Other aspects, features, and benefits of various embodiments of the invention will become more fully apparent, by way of example, from the following detailed description and the accompanying drawings, in which:

FIG. 5 shows a flowchart of a signal-processing method that can be used at the receiver of the optical transport system shown in FIG. 1 according to one embodiment of the disclosure.

DETAILED DESCRIPTION

Figure 1:
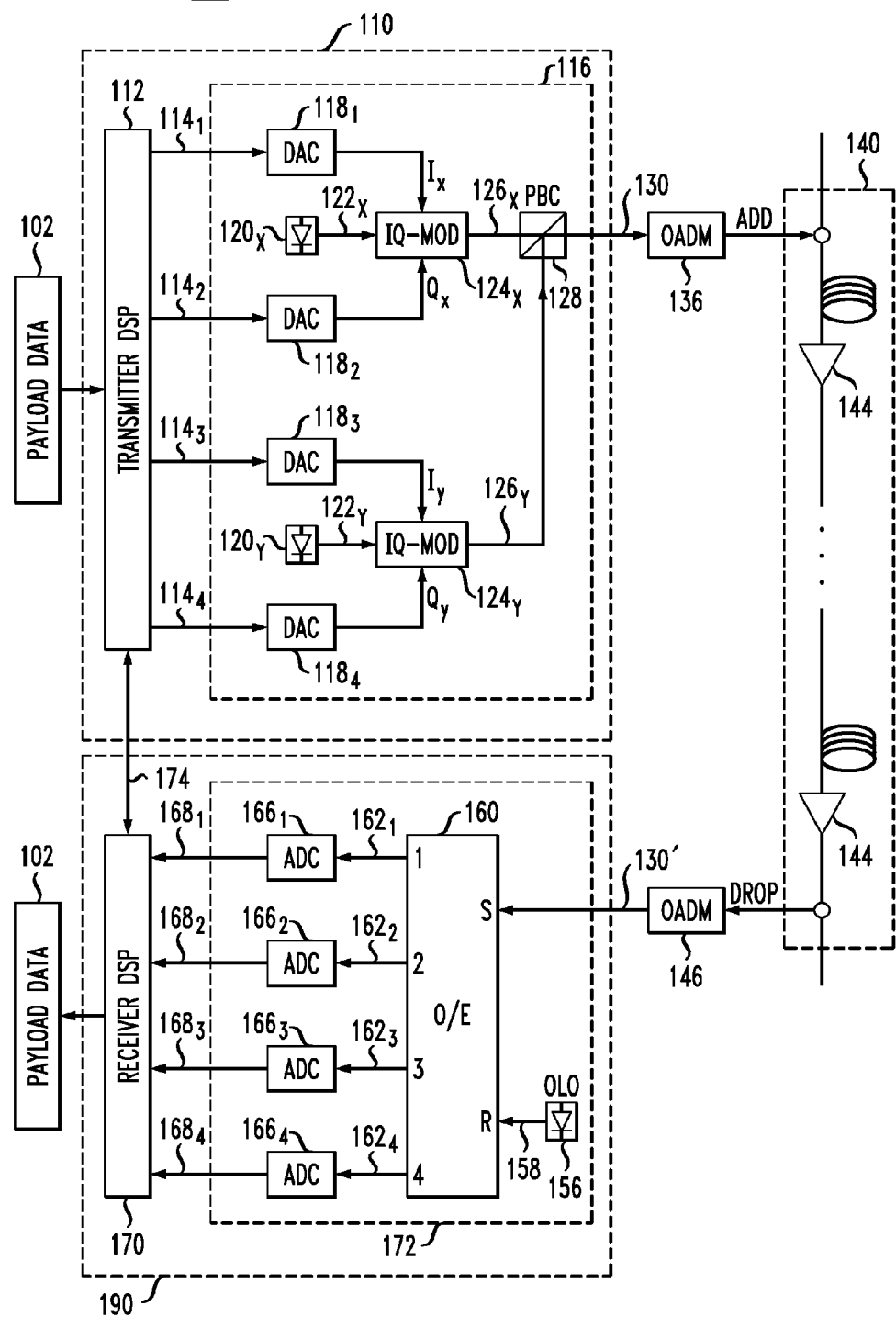
FIG. 1 shows a block diagram of an optical transport system in which various embodiments of the disclosure can be practiced.

FIG. 1 shows a block diagram of an optical transport system 100 in which various embodiments of the disclosure can be practiced. System 100 has an optical transmitter 110 that is configured to (i) modulate light using constellation symbols and (ii) apply a resulting optical output signal 130 to an optical transport link 140. System 100 also has an optical receiver 190 that is configured to appropriately process a corresponding optical input signal 130' received via optical transport link 140 from transmitter 110 to recover the corresponding original data. Note that optical transport link 140 transforms signal 130 into signal 130' by imposing various signal distortions including, inter alia, additive white Gaussian noise (AWGN) and various forms of nonlinear noise. Both transmitter 110 and receiver 190 rely on the same selected constellation in the processes of generating signal 130 and decoding signal 130', respectively.

Transmitter 110 receives a digital (electrical) input stream 102 of payload data and applies it to a digital signal processor (DSP) 112. DSP 112 processes input stream 102 to generate digital signals $114_1$-$114_4$. Such processing may include forward-error-correction (FEC) encoding, which adds redundancy to the transmitted data, e.g., as further described below in reference to FIGS. 3 and 4. In each signaling interval (also referred to as a time slot corresponding to an optical symbol or a symbol period), signals $114_1$ and $114_2$ carry digital values that represent the in-phase (I) component and quadrature (Q) component, respectively, of a corresponding constellation point intended for transmission using X-polarized light. Signals $114_3$ and $114_4$ similarly carry digital values that represent the I and Q components, respectively, of the corresponding constellation point intended for transmission using Y-polarized light, where the Y-polarization is orthogonal to the X-polarization.

An electrical-to-optical (E/O) converter (also sometimes referred to as a front-end circuit) 116 of transmitter 110 transforms digital signals $114_1$-$114_4$ into modulated optical output signal 130. More specifically, digital-to-analog converters (DACs) $118_1$ and $118_2$ transform digital signals $114_1$ and $114_2$ into an analog form to generate drive signals $I_X$ and $Q_X$, respectively. Drive signals $I_X$ and $Q_X$ are then used, in a conventional manner, to drive an I-Q modulator $124_X$. Based on drive signals $I_X$ and $Q_X$, I-Q modulator $124_X$ modulates an X-polarized beam $122_X$ of light supplied by a laser source $120_X$, thereby generating a modulated optical signal $126_X$.

DACs $118_3$ and $118_4$ similarly transform digital signals $114_3$ and $114_4$ into an analog form to generate drive signals $I_Y$ and $Q_Y$, respectively. Based on drive signals $I_Y$ and $Q_Y$, an I-Q modulator $124_Y$ modulates a Y-polarized beam $122_Y$ of light supplied by a laser source $120_Y$, thereby generating a modulated optical signal $126_Y$.

In an alternative embodiment, laser sources $120_X$ and $120_Y$ can be replaced by a single laser source coupled to an optical splitter so that (i) an output port of the optical splitter that outputs X-polarized light is configured to provide X-polarized beam $122_X$ and (ii) an output port of the optical splitter that outputs Y-polarized light is configured to provide Y-polarized beam $122_Y$.

A polarization beam combiner 128 combines modulated optical signals $126_X$ and $126_Y$ to generate optical output signal 130.

Optical output signal 130 can be applied to an optional optical add-drop multiplexer (OADM) 136 configured to add this signal, as known in the art, to other optical signals that are being transported via optical transport link 140.

Link 140 is illustratively shown as being an amplified link having a plurality of optical amplifiers 144 configured to amplify the optical signals that are being transported through the link, e.g., to counteract signal attenuation. Note that an optical link that has only one or even no optical amplifiers can alternatively be used as well. After propagating the intended length of link 140, optical signal 130 becomes optical signal 130', which is dropped from the link via another optional optical add-drop multiplexer, OADM 146, and directed to receiver 190 for processing.

Receiver 190 has a front-end circuit 172 comprising an optical-to-electrical (O/E) converter 160, four analog-to-digital converters (ADCs) $166_1$-$166_4$, and an optical local oscillator (OLO) 156. O/E converter 160 has (i) two input ports labeled S and R and (ii) four output ports labeled 1 through 4. Input port S receives optical signal 130'. Input port R receives an optical reference signal 158 generated by OLO 156. Reference signal 158 has an optical-carrier frequency (wavelength) that is sufficiently close to that of signal 130' to enable homodyne or intradyne detection of the latter signal. Reference signal 158 can be generated, e.g., using a tunable laser controlled by a wavelength-control loop (not explicitly shown in FIG. 1) that forces the output wavelength of the tunable laser to closely track the carrier wavelength of signal 130'.

O/E converter 160 operates to mix input signal 130' and reference signal 158 to generate eight mixed optical signals (not explicitly shown in FIG. 1). O/E converter 160 then converts the eight mixed optical signals into four electrical signals $162_1$-$162_4$ that are indicative of complex values corresponding to the two orthogonal-polarization components of signal 130'. For example, electrical signals $162_1$ and $162_2$ may be an analog in-phase signal and an analog quadrature signal, respectively, corresponding to the X-polarization component of signal 130'. Electrical signals $162_3$ and $162_4$ may similarly be an analog in-phase signal and an analog quadrature signal, respectively, corresponding to the Y-polarization component of signal 130'.

In one embodiment, O/E converter 160 is a polarization-diverse 90-degree optical hybrid (PDOH) with four balanced photo-detectors coupled to its eight output ports. Various suitable PDOHs are commercially available, e.g., from Optoplex Corporation of Fremont, Calif., and CeLight, Inc., of Silver Spring, Md. Additional information on various O/E converters that can be used to implement O/E converter 160 in various embodiments of system 100 are disclosed, e.g., in U.S. Patent Application Publication Nos. 2010/0158521 and 2011/0038631, and International Patent Application No. PCT/US09/37746 (filed on Mar. 20, 2009), all of which are incorporated herein by reference in their entirety.

Each of electrical signals $162_1$-$162_4$ generated by O/E converter 160 is converted into digital form in a corresponding one of ADCs $166_1$-$166_4$. Optionally, each of electrical signals $162_1$-$162_4$ may be amplified in a corresponding amplifier (not explicitly shown) prior to the resulting signal being converted into digital form. Digital signals $168_1$-$168_4$ produced by ADCs $166_1$-$166_4$ are then appropriately processed by a digital signal processor (DSP) 170 to recover, if possible, the data of the original input stream 102 applied to transmitter 110.

DSP 170 is configured to decode digital signals $168_1$-$168_4$ to recover original payload data 102. In particular, DSP 170 is configured to perform FEC-decoding processing using frame-based maximum likelihood sequence estimation (MLSE) applied to a set of values derived from digital-signal samples provided by digital signals $168_1$-$168_4$ and corresponding to an FEC-encoded data frame. In addition, DSP 170 may be configured to perform various channel-equalization and/or distortion-correction procedures.

In one embodiment, DSP 170 is also configured to monitor the bit error rate (BER) and/or symbol error rate (SER) corresponding to signal 130', e.g., based on the signal statistics acquired from the processing of digital signals $168_1$-$168_4$. Based on said monitoring, DSP 170 is configured to generate a control signal for transmitter 110 and direct it to the transmitter, e.g., via a signal path 174. Based on the received control signal, transmitter 110 can configure DSP 112 to change the FEC-coding rate. For example, if the BER at receiver 190 is relatively low, then DSP 112 might be configured to increase the FEC-coding rate (i.e., use fewer parity bits per payload bit). Alternatively, if the BER at receiver 190 is relatively high, then DSP 112 can be configured to decrease the FEC-coding rate (i.e., use more parity bits per payload bit). Advantageously, this rate-adaptation scheme enables transmitter 110 and receiver 190 to dynamically select a most-efficient FEC-coding rate according to the real-time channel quality of link 140, thereby increasing the useful data throughput for system 100. Note that, in different embodiments, signal path 174 may be an optical path, an electrical path, a wireless path, or a combination thereof.

Figure 2:
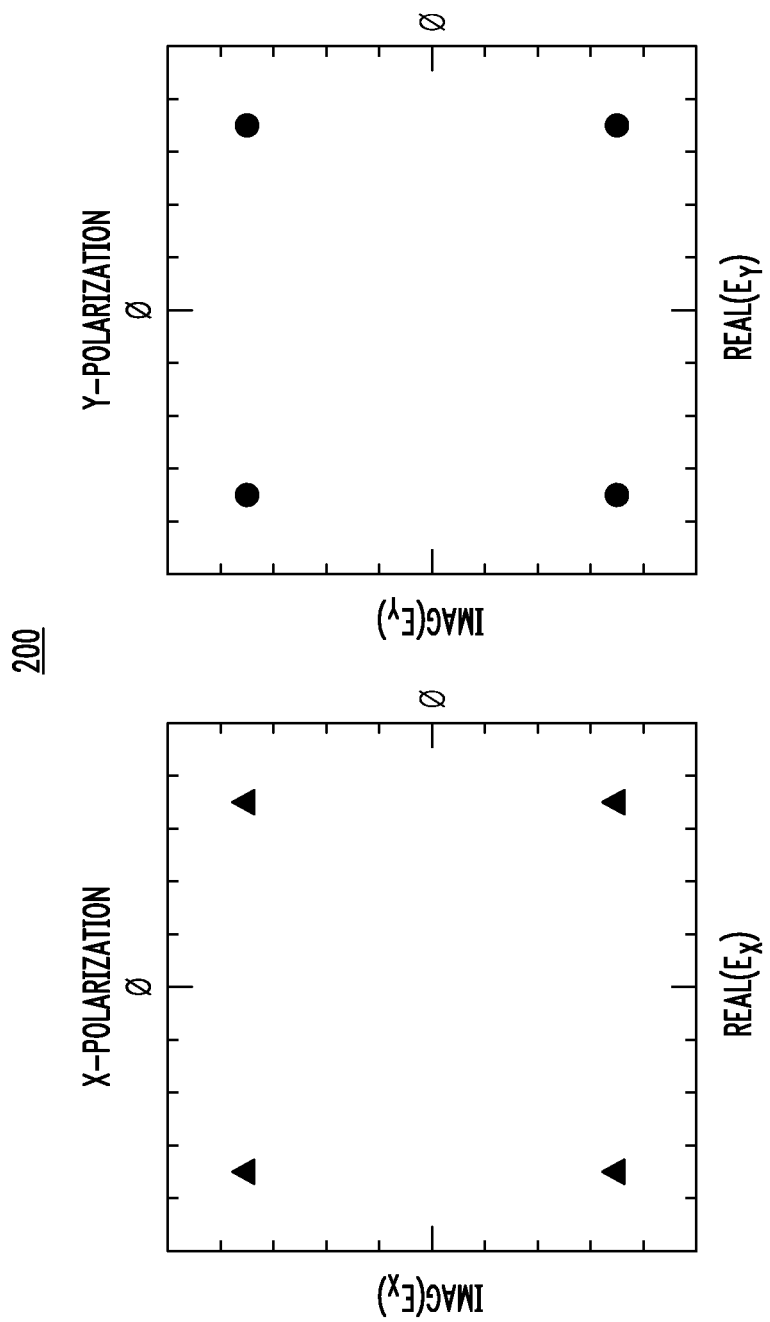
FIG. 2 graphically shows a four-dimensional PDM (polarization-division-multiplexed) constellation that can be used in the optical transport system shown in FIG. 1 according to one embodiment of the disclosure.

FIG. 2 graphically shows a four-dimensional PDM (polarization-division-multiplexed) constellation 200 that can be used in system 100 according to one embodiment of the disclosure. The first two dimensions of constellation 200 are represented by a first complex plane shown in the left panel of FIG. 2 and corresponding to the X-polarization of optical signal 130. The remaining two dimensions of constellation 200 are similarly represented by a second complex plane shown in the right panel of FIG. 2 and corresponding to the Y-polarization of optical signal 130. Each of these two complex planes has four constellation points corresponding to a respective conventional two-dimensional quaternary phase-shift keying (QPSK) constellation. Each constellation symbol of constellation 200 consists of two constellation points, one from the first complex plane (the left panel of FIG. 2) and one from the second complex plane (the right panel of FIG. 2). As a result, constellation 200 consists of sixteen different constellation symbols.

As known in the art, a constellation point of a two-dimensional constellation, such as a QPSK constellation or a QAM (quadrature amplitude modulation) constellation, can be uniquely characterized by the amplitude and phase of the corresponding vector on the complex plane. The amplitude and phase of a constellation point can be converted by the transmitter, such as transmitter 110 (FIG. 1), into the electric-field strength and phase, respectively, of the modulated optical signal that is applied by the transmitter to the optical link.

In a representative configuration, to transmit an optical symbol of constellation 200 in a time slot of optical signal 130, transmitter 110 generates (i) X-polarized light modulated using one of the constellation points shown in the left panel of FIG. 2 and (ii) Y-polarized light modulated using one of the constellation points shown in the right panel of FIG. 2. As a result, each optical symbol of optical signal 130 generated using constellation 200 can carry four bits of information, e.g., two bits on the X-polarized light and another two bits on the Y-polarized light. This particular transmission format is often referred to in the literature as PDM-QPSK or DP (dual-polarization) QPSK.

In one configuration, transmitter 110 can apply FEC coding so that each optical symbol of optical signal 130 generated using constellation 200 carries three original payload bits (hereafter referred to as source bits) from data sequence 102 (FIG. 1) and one parity bit. For example, if b1, b2, and b3 are the source bits, then the parity bit (b4) can be generated by serially applying two XOR operations to the source bits, e.g., as follows: $b4=b1\oplus b2\oplus b3$. The coding rate of this FEC-coding format is ¾ because each optical symbol carries three source bits and one parity bit, for a total of four bits.

In one configuration, bits b1-b4 can be arranged to form an FEC-encoded data frame in the order they are numbered, e.g., {b1, b2, b3, b4}. In an alternative configuration, bits b1-b4 can be arranged in the frame in any other designated (e.g., non-consecutive) order. For example, any fixed permutation of sequence {b1, b2, b3, b4} can be used for generating an FEC-encoded data frame from bits b1-b4. An FEC-encoded data frame generated in this manner is hereafter referred to as an F4 frame, where F4≡{f1, f2, f3, f4}, and variables f1-f4 designate bits b1-b4 in their order of appearance in the F4 frame. As already indicated above, an F4 frame can be transmitted using a single symbol of constellation 200.

Note that optical signal 130 generated in this manner utilizes a subset of only eight different constellation symbols of constellation 200, out of the sixteen different constellation symbols of that constellation. Due to the latter property, power efficiency of this transmission format is similar to that of a transmission format that uses a PS (polarization-switched) QPSK constellation (see, e.g., the paper by M. Karlsson and E. Agrell, "Which Is the Most Power-Efficient Modulation Format in Optical Links?" 22 Jun. 2009/Vol. 17, No. 13/OPTICS EXPRESS/pp. 10814-10819, which paper is incorporated herein by reference in its entirety). As known in the art, to transmit a PS-QPSK symbol, the transmitter can select one of the X- and Y-polarizations and then modulate light having the selected polarization using one of the constellation points shown in the corresponding panel of FIG. 2, while transmitting no light on the non-selected polarization. As a result, each PS-QPSK symbol carries three bits of information, e.g., two bits on the selected polarization of light and an additional bit in the identity (X or Y) of that polarization.

Figure 3:
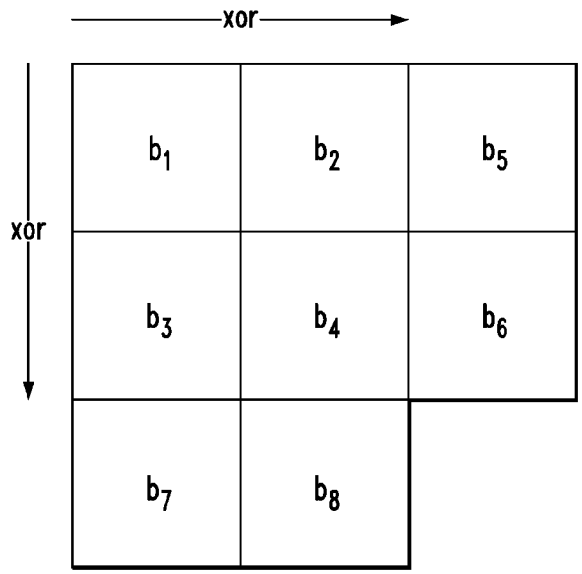
FIG. 3 pictorially shows a method of generating an FEC-encoded data frame that can be used at the transmitter of the optical transport system shown in FIG. 1 according to one embodiment of the disclosure.

FIG. 3 pictorially shows a method of generating an FEC-encoded data frame that can be used at transmitter 110 (FIG. 1) according to one embodiment of the disclosure. More specifically, each square in FIG. 3 represents a corresponding bit of the frame, for a total of eight bits per frame. Bits b1-b4 are source bits from data stream 102 (FIG. 1). Bits b5-b8 are parity bits that are generated from source bits b1-b4 as indicated by the two arrows in FIG. 3. For example, parity bit b7 is generated by applying an XOR operation to source bits b1 and b3, i.e., $b7=b1\oplus b3$. Similarly, parity bit b5 is generated by applying an XOR operation to source bits b1 and b2, i.e., $b5=b1\oplus b2$, etc.

Since each FEC-encoded data frame generated as indicated in FIG. 3 has four source bits and four parity bits, for a total of eight bits, the coding method illustrated in FIG. 3 has an FEC-coding rate of ½ (=4/8). In one configuration, bits b1-b8 can be arranged to form an FEC-encoded data frame in the order they are numbered, e.g., {b1, b2, b3, b4, b5, b6, b7, b8}. In an alternative configuration, bits b1-b8 can be arranged in the frame in any other designated (e.g., non-consecutive) order. For example, any fixed permutation of sequence {b1, b2, b3, b4, b5, b6, b7, b8} can be used for generating an FEC-encoded data frame from bits b1-b8. An FEC-encoded data frame generated as indicated above is hereafter referred to as an F8 frame, where F8≡{f1, f2, f3, f4, f5, f6, f7, f8}, and variables f1-f8 designate bits b1-b8 in their order of appearance in the F8 frame.

Transmitter 110 can transmit an F8 frame, e.g., in a PDM-QPSK configuration, using two symbols of constellation 200 (FIG. 2). For example, the first of the two transmitted symbols can carry bits f1-f4, with bits f1-f2 being transmitted on the X-polarization of optical signal 130, and bits f3-f4 being transmitted on the Y-polarization of that optical signal. The second of the two transmitted symbols can then carry bits f5-f8, with bits f5-f6 being transmitted on the X-polarization of optical signal 130, and bits f7-f8 being transmitted on the Y-polarization of that optical signal. One of ordinary skill in the art will understand that other schemes for converting the eight bits of an F8 frame into two PDM-QPSK symbols of constellation 200 are also possible.

Figure 4:
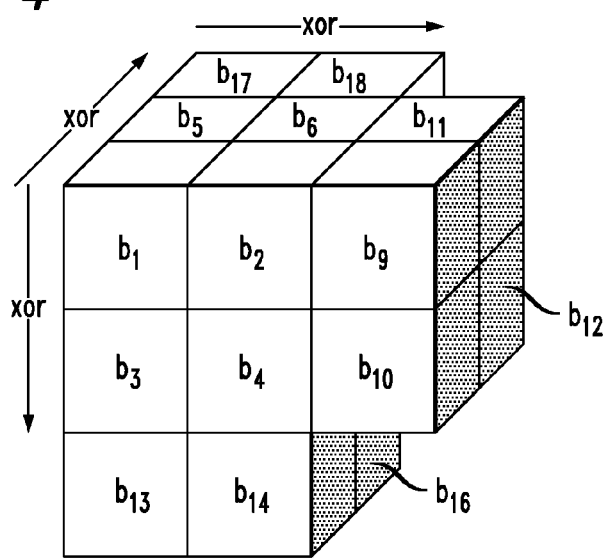
FIG. 4 pictorially shows a method of generating an FEC-encoded data frame that can be used at the transmitter of the optical transport system shown in FIG. 1 according to another embodiment of the disclosure.

FIG. 4 pictorially shows a method of generating an FEC-encoded data frame that can be used at transmitter 110 (FIG. 1) according to another embodiment of the disclosure. More specifically, each cube in FIG. 4 represents a corresponding bit of the frame, for a total of twenty bits per frame. Bits b1-b8 are source bits from data stream 102 (FIG. 1). Bits b9-b20 are parity bits that are generated from source bits b1-b8 as indicated by the three arrows in FIG. 4. For example, parity bit b17 is generated by applying an XOR operation to source bits b1 and b5, i.e., $b17=b1\oplus b5$. Similarly, parity bit b9 is generated by applying an XOR operation to source bits b1 and b2, i.e., $b9=b1\oplus b2$. Parity bit b13 is generated by applying an XOR operation to source bits b1 and b3, i.e., $b13=b1\oplus b3$, etc. Note that the cubes corresponding to bits b7, b8, b15, b19, and b20 are not directly visible in the three-dimensional view shown in FIG. 4.

Since each FEC-encoded data frame generated as indicated in FIG. 4 has eight source bits and twelve parity bits, for a total of twenty bits, the coding method illustrated in FIG. 4 has an FEC-coding rate of ⅖ (=8/20). In one configuration, bits b1-b20 can be arranged to form an FEC-encoded data frame in the order they are numbered, e.g., {b1, b2, b3, . . . , b19, b20}. In an alternative configuration, bits b1-b20 can be arranged in the frame in any other designated (e.g., non-consecutive) order. For example, any fixed permutation of sequence {b1, b2, b3, . . . , b19, b20} can be used for generating an FEC-encoded data frame from bits b1-b20. An FEC-encoded data frame generated as indicated above is hereafter referred to as an F20 frame, where F20={f1, f2, f3, . . . , f19, f20}, and variables f1-f20 designate bits b1-b20 in their order of appearance in the F20 frame.

Transmitter 110 can transmit an F20 frame, e.g., in a PDM-QPSK configuration, using five symbols of constellation 200 (FIG. 2). For example, the first of the five transmitted symbols can carry bits f1-f4, with bits f1-f2 being transmitted on the X-polarization of optical signal 130, and bits f3-f4 being transmitted on the Y-polarization of that optical signal. The second of the five transmitted symbols can carry bits f5-f8, with bits f5-f6 being transmitted on the X-polarization of optical signal 130, and bits f7-f8 being transmitted on the Y-polarization of that optical signal. The third of the five transmitted symbols can carry bits f9-f12, with bits f9-f10 being transmitted on the X-polarization of optical signal 130, and bits f11-f12 being transmitted on the Y-polarization of that optical signal. The fourth of the five transmitted symbols can carry bits f13-f16, with bits f13-f14 being transmitted on the X-polarization of optical signal 130, and bits f15-f16 being transmitted on the Y-polarization of that optical signal. Finally, the fifth of the five transmitted symbols can carry bits f17-f20, with bits f17-f18 being transmitted on the X-polarization of optical signal 130, and bits f19-f20 being transmitted on the Y-polarization of that optical signal. One of ordinary skill in the art will understand that other schemes for converting the twenty bits of an F20 frame into five PDM-QPSK symbols of constellation 200 are also possible.

As already indicated above, based on the control signal received from receiver 190 via path 174, transmitter 110 can configure DSP 112 to change the FEC-coding rate. For example, DSP 112 can switch the FEC-coding rate by selecting a suitable rate from a set comprising some of the above-described rate values of ¾, ½, and ⅖. Alternatively or in addition, other FEC-coding rate values can similarly be used.

FIG. 5 shows a flowchart of a signal-processing method 500 that can be used at receiver 190 (FIG. 1) according to one embodiment of the disclosure. For illustration purposes, method 500 is described in reference to an F8 frame (described above in reference to FIG. 3). However, various embodiments of method 500 are not so limited. From the provided description of the various steps of method 500, one of ordinary skill in the art will understand how to apply this method to FEC-encoded data frames of different lengths.

At step 502 of method 500, DSP 170 converts the digital samples corresponding to an FEC-encoded data frame that it received via digital signals $168_1$-$168_4$ into a corresponding set of complex values. The conversion process of step 502 may include, but is not limited to signal processing corresponding to various channel-equalization and distortion-correction techniques, e.g., as described in commonly owned U.S. patent application Ser. Nos. 12/964,929 and 12/964,945, both of which are incorporated herein by reference in their entirety. For example, the signal processing of step 502 may include timing recovery, frame synchronization, electronic polarization rotation, electronic dispersion compensation, electronic frequency estimation, electronic compensation of the frequency offset (if any) between local oscillator signal 158 and the carrier frequency of optical signal 130, electronic channel estimation, and electronic channel equalization.

For an F8 frame, DSP 170 performs step 502 by converting the digital samples received via digital signals $168_1$-$168_4$ into a set of four complex values {C1, C2, C3, C4}, where C1 and C2 represent the first transmitted symbol of constellation 200 in an FEC-encoded data frame, and C3 and C4 represent the second transmitted symbol of constellation 200 in that frame.

At step 504, DSP 170 applies frame-based MLSE (maximum likelihood sequence estimation) processing to the set of complex values generated at step 502. More specifically, the MLSE processing of step 502 utilizes the data redundancies present in the FEC-encoded data frame to find a set of constellation points or symbols that corresponds to a maximum a posteriori probability that the found set has been sent by transmitter 110 given that the set of the complex values generated at step 502 has been detected by receiver 190.

For example, for an F8 frame, the frame-based MLSE processing of step 504 yields a set of four constellation points {P1, P2, P3, P4} for which the Euclidean-distance metric to sequence {C1, C2, C3, C4} in the four-dimensional space of constellation 200 has a minimum value. If an FEC-encoded frame was generated and transmitted by transmitter 110 in accordance with the method corresponding to FIG. 3, then constellation points P1 and P3 belong to the set of constellation points shown in the left panel of FIG. 2, and constellation points P2 and P4 belong to the set of constellation points shown in the right panel of FIG. 2.

Representative examples of MLSE methods that can be used to implement step 504 are disclosed, e.g., in U.S. Pat. No. 7,474,860 and U.S. Patent Application Publication Nos. 2008/0199191, 2009/0147648, and 2010/0061737, all of which are incorporated herein by reference in their entirety.

At step 506, DSP 170 uses the set of constellation points or symbols found at step 504 to determine the corresponding source bits.

For example, for an F8 frame, the processing of step 506 can be implemented as follows. First, the sequence of four constellation points {P1, P2, P3, P4} found at step 504 is converted into a corresponding sequence of eight bits {f1, f2, f3, f4, f5, f6, f7, f8}, where bits f1 and f2 are determined based on constellation point P1; bits f3 and f4 are determined based on constellation point P2; bits f5 and f6 are determined based on constellation point P3; and bits f7 and f8 are determined based on constellation point P4. Second, the sequence of eight bits {f1, f2, f3, f4, f5, f6, f7, f8} is appropriately sieved to select the four source bits b1-b4.

At step 508, DSP 170 appropriately concatenates the sets of source bits recovered at multiple instances of step 506 from the corresponding different FEC-encoded data frames to generate output data stream 102 (see FIG. 1). Provided that the used FEC-coding rate is adequate for the present channel conditions in link 140, the output data stream 102 generated by DSP 170 in receiver 190 is a copy of the input data stream 102 applied to DSP 112 in transmitter 110 (see FIG. 1).

In one embodiment, method 500 can be used as a part of a more extended FEC coding scheme having an outer FEC and an inner FEC, with method 500 corresponding to the inner FEC. For example, if the outer FEC is a hard-decision FEC (e.g., a Reed-Solomon code), then method 500 outputs the decoded source bits, as described above. However, if the outer FEC is a soft-decision FEC, then method 500 can be implemented to output log-likelihood ratios (LLRs).

As known in the art, an LLR is the logarithm of the ratio of probabilities of a "0" bit being transmitted versus a "1" bit being transmitted for the given received signal. For sequences containing more than one bit, this definition of the LLR is modified accordingly to take into account the multiple bits of the sequence. For example, for an F8 frame, the LLR for bit b (denoted as L(b)) can be defined using Eq. (1):

$$L(b) = \log\left(\frac{\sum_{s \in S_0} \exp\left(-\frac{1}{\sigma^2} \sum_{i=1}^{4} (x_i - s_{xi})^2 + (y_i - s_{yi})^2\right)}{\sum_{s \in S_1} \exp\left(-\frac{1}{\sigma^2} \sum_{i=1}^{4} (x_i - s_{xi})^2 + (y_i - s_{yi})^2\right)}\right) \quad (1)$$

where $S_0$ is a set of constellation points for which b=0; $S_1$ is a set of constellation points for which b=1; x, and y, are the real and imaginary parts, respectively, of complex value Ci (see step 502); $s_{xi}$ and $s_{yi}$ are the real and imaginary parts, respectively, of a constellation point; and $\sigma^2$ is the noise variance. A more detailed description of suitable LLR algorithms can be found, e.g., in Viterbi, A. J., "An Intuitive Justification and a Simplified Implementation of the MAP Decoder for Convolutional Codes," IEEE Journal on Selected Areas in Communications, 1998, vol. 16, No. 2, pp. 260-264, which is incorporated herein by reference in its entirety.

While this invention has been described with reference to illustrative embodiments, this description is not intended to be construed in a limiting sense.

Although different embodiments of the disclosure have been described in reference to PDM-QPSK constellation 200 (FIG. 2), the present disclosure is not so limited. For example, some embodiments of the disclosure can use a PDM-QAM constellation.

Although different embodiments of the disclosure have been described with an implicit assumption that each of ADCs 166₁-166₄ is configured to generate one digital signal sample per symbol period, the present disclosure is not so limited. For example, each of ADCs 166₁-166₄ can be configured to generate two or more digital signal samples per symbol period. The sampling rate for ADCs 166₁-166₄ can be selected, e.g., as described in the above-cited U.S. Pat. No. 7,474,860.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks or tapes, hard drives, or optically readable digital data storage media. The embodiments are also intended to cover computers programmed to perform said steps of methods described herein.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising an optical receiver configured to:
convert a modulated optical signal corresponding to a first forward error correction (FEC)-encoded data frame into a first set of digital complex values that includes (i) a first subset of digital complex values corresponding to a first polarization of light and (ii) a second subset of digital complex values corresponding to a second polarization of light;
apply maximum likelihood sequence estimation (MLSE) processing to the first set of digital complex values to determine an estimated set of constellation points of a polarization-division-multiplexed (PDM) constellation that corresponds to the modulated optical signal, wherein:
a first constellation point in said estimated set of constellation points corresponds to the first polarization of light and encodes a first source bit of the first FEC-encoded data frame; and
a second constellation point in said estimated set of constellation points corresponds to the second polarization of light and encodes a parity bit of the first FEC-encoded data frame generated using the first source bit; and
recover of source bits of the first FEC-encoded data frame from said estimated set of constellation points.

2. The apparatus of claim 1, wherein the first polarization is orthogonal to the second polarization.

3. The apparatus of claim 1, wherein the PDM constellation is a PDM-QPSK constellation having four constellation points corresponding to the first polarization of light and another four constellation points corresponding to the second polarization of light orthogonal to the first polarization.

4. The apparatus of claim 1, wherein the optical receiver is further configured to concatenate two or more sets of source bits corresponding to two or more different FEC-encoded data frames to generate an output data stream corresponding to the modulated optical signal.

5. The apparatus of claim 1, wherein the optical receiver is further configured to:
convert a modulated optical signal corresponding to a second FEC-encoded data frame into a second set of digital complex values that includes (i) a third subset of digital complex values corresponding to the first polarization of light and (ii) a fourth subset of digital complex values corresponding to the second polarization of light; and
apply MLSE processing to said second set of digital complex values to recover source bits of the second FEC-encoded data frame, wherein:
the first FEC-encoded data frame has a first FEC-coding rate;
the second FEC-encoded data frame has a second FEC-coding rate; and
the second FEC-coding rate is different from the first FEC-coding rate.

6. The apparatus of claim 5, wherein:
the first FEC-encoded data frame has a first number of source bits;
the second FEC-encoded data frame has a second number of bits; and
the first number is different from the second number.

7. The apparatus of claim 5, wherein the optical receiver is configured to determine source bits from an FEC-encoded data frame whose FEC-coding rate belongs to a set of FEC-coding rates comprising each of the values of $3/4$, $1/2$, and $2/3$.

8. The apparatus of claim 1, wherein the optical receiver comprises:
a front-end circuit configured to:
mix the modulated optical signal with an optical reference signal to generate a plurality of mixed optical signals; and
convert the plurality of mixed optical signals into a corresponding plurality of digital electrical signals, wherein the plurality of digital electrical signals comprises (i) a first in-phase signal and a first quadrature signal that have digital signal samples corresponding to the first polarization of light and (ii) a second in-phase signal and a second quadrature signal that have digital signal samples corresponding to the second polarization of light; and
a digital signal processor configured to convert the digital signal samples corresponding to the first and second polarizations of light into the first set of digital complex values.

9. The apparatus of claim 8, wherein, to convert the digital signal samples into the first set of digital complex values, the digital signal processor is configured to perform one or more of the following:
timing recovery for the first FEC-encoded data frame;
frame synchronization for the first FEC-encoded data frame;
electronic polarization rotation applied to the digital signal samples;
electronic frequency estimation of a carrier frequency of the modulated optical signal;
electronic compensation of a frequency offset between a carrier frequency of the optical reference signal and the carrier frequency of the modulated optical signal;
electronic compensation of effects of polarization-mode dispersion in the modulated optical signal;
electronic compensation of effects of chromatic dispersion in the modulated optical signal; and
electronic channel equalization applied to the digital signal samples.

10. The apparatus of claim 1, wherein the optical receiver is further configured to:
determine a bit-error rate (BER) corresponding to the modulated optical signal;
generate a control signal based on the determined BER; and
send the control signal to an optical transmitter that caused the optical receiver to receive the modulated optical signal.

11. The apparatus of claim 10, further comprising the optical transmitter, wherein the optical transmitter is configured to change an FEC-coding rate from a value used for the first FEC-encoded data frame to a different value based on the control signal.

12. The apparatus of claim 10, further comprising the optical transmitter, wherein the optical transmitter is configured to generate one or more parity bits for the first FEC-encoded data frame by applying an XOR operation to two or more source bits.

13. The apparatus of claim 10, further comprising the optical transmitter, wherein the optical transmitter comprises:
a digital signal processor configured to convert an input data stream into a sequence of FEC-encoded data frames and further convert each FEC-encoded data frame into a respective set of constellation points of the PDM constellation; and
an optical modulator configured to modulate an optical carrier using said sets of constellation points to generate a modulated optical signal for transmission of said FEC-encoded data frames to the optical receiver.

14. The apparatus of claim 13, wherein the PDM constellation is a PDM-QPSK constellation having four constellation points corresponding to a first polarization of light and another four constellation points corresponding to a second polarization of light orthogonal to the first polarization.

15. The apparatus of claim 1,
wherein the second constellation point also encodes a second source bit of the first FEC-encoded data frame; and
wherein the parity bit has been generated using the second source bit.

16. The apparatus of claim 15,
wherein the first constellation point also encodes a third source bit of the first FEC-encoded data frame; and
wherein the parity bit has been generated using the third source bit.

17. An apparatus comprising an optical transmitter configured to:
generate a first modulated optical signal corresponding to a first forward error correction (FEC)-encoded data frame, said first modulated optical signal having a first polarization;
generate a second modulated optical signal corresponding to the first FEC-encoded data frame, said second modulated optical signal having a second polarization; and
multiplex the first and second modulated optical signals for transmission of the first FEC-encoded data frame, wherein:
the first modulated optical signal carries a first source bit of the first FEC-encoded data frame; and
the second modulated optical signal carries a parity bit of the first FEC-encoded data frame generated using the first source bit.

* * * * *

UNITED STATES PATENT AND TRADEMARK OFFICE
CERTIFICATE OF CORRECTION

PATENT NO.        : 8,983,294 B2                              Page 1 of 1
APPLICATION NO.   : 13/537131
DATED             : March 17, 2015
INVENTOR(S)       : Timo J. Pfau et al.

It is certified that error appears in the above-identified patent and that said Letters Patent is hereby corrected as shown below:

Claims
In column 13, line 27, Claim 1, remove the first use of the word "of".

Signed and Sealed this
Tenth Day of November, 2015

Michelle K. Lee
*Director of the United States Patent and Trademark Office*